United States Patent [19]

Brannon

[11] Patent Number: 5,286,170

[45] Date of Patent: Feb. 15, 1994

[54] HELICOPTER WIRE STRIKE CUTTER

[76] Inventor: William W. Brannon, P.O. Box 5413, Fort Richardson, Ak. 99505

[21] Appl. No.: 981,187

[22] Filed: Nov. 24, 1992

[51] Int. Cl.⁵ .............................................. B64C 27/00
[52] U.S. Cl. ............................ 416/247 R; 416/146 R; 244/17.11
[58] Field of Search ........... 416/146 R, 168 R, 247 R, 416/245 R; 415/121.1; 244/17.11; 83/672, 663, 665

[56] References Cited

U.S. PATENT DOCUMENTS

| | | |
|---|---|---|
| 3,591,310 | 7/1971 | Mouille . |
| 4,146,353 | 3/1979 | Carrouset ........................... 416/176 |
| 4,189,283 | 2/1980 | McCoubrey . |
| 4,215,833 | 8/1980 | Chan ................................. 244/17.11 |
| 4,407,467 | 10/1983 | Emigh et al. ..................... 244/17.11 |
| 4,447,215 | 5/1984 | Govan .............................. 416/146 R |
| 4,892,461 | 1/1990 | Matsumoto et al. . |
| 5,042,967 | 8/1991 | Desjardins . |
| 5,047,106 | 9/1991 | Matsumoto et al. . |

OTHER PUBLICATIONS

Operators Manual TM55-1520-237-10.

Primary Examiner—Edward K. Look
Assistant Examiner—Mark Sgantzos
Attorney, Agent, or Firm—John W. Logan, Jr.

[57] ABSTRACT

A helicopter strike wire cutting apparatus extending from the fuselage of the helicopter to the rotor blades for cutting wires that strike the helicopter during flight. The cutting apparatus includes cutting edges along the rotor control rods and can be arranged to direct a strike wire toward the midpoint of the rod. A second embodiment having cutting edges on a drum rotating with the rotor is also disclosed.

18 Claims, 6 Drawing Sheets

HELICOPTER WIRE STRIKE CUTTER

BACKGROUND OF THE INVENTION

1. Field of the Invention

The present invention relates to new and useful improvements in wire cutting apparatus for helicopters and more specifically, to cutting apparatus intermediate the rotor and the helicopter fuselage for cutting wires which may become engaged in this area before the wire causes a severe crash.

2. Description of the Prior Art

Present wire cutters on helicopters for protecting that area between the rotor and the fuselage consist of a fixed V-shaped cutter facing in the forward direction on the top of the helicopter fuselage in front of the rotor mast. Cutters of this type are effective when the wire struck by the helicopter is at a ninety degree angle to the path of travel of the helicopter. When this type of fixed V-shaped cutter strikes a wire at other than a ninety degree angle, the torque exerted on the cutter will cause it to collapse, rendering the cutter ineffective and resulting in a possible crash of the helicopter.

To provide effective protection to the helicopter, regardless of the direction of wire strike, cutting means vertically spanning the space between the fuselage and the rotor is provided which rotates with the rotor and which has cutting edges thereon adapted to engage and direct the wire toward the vertical midpoint of the cutter and cut the wire. This cutting means can be multiple cutting edges on the pitch control rods for the rotor blades extending lengthwise thereof and skewed relative to the longitudinal axis of each pitch control rod. Alternatively, if the pitch control rods do not span the entire space between the fuselage and rotor, a cylindrical drum may be provided surrounding the pitch control rods and carried by the rotor mast so that it rotates with the rotors. Cutting blades skewed in such a manner relative to the axis of the drum to drive any engaged wire toward the middle of the drum are mounted on the peripheral surface of the drum and serve to cut the engaged wire. The cutting blades on the drum preferably are arranged in a herringbone pattern with the ends of the blades adjacent the top and bottom of the drum being in advance of midportion of the blades in the direction of rotation of the drum.

From the above, it can be seen that the primary object of the present invention is to provide effective wire cutting means to protect a helicopter from a wire strike intermediate the rotor and the fuselage.

A further object of the present invention is to provide novel wire cutting means which will not add appreciably to the weight of the helicopter and may be installed quickly and efficiently.

Other objects will be apparent from the description of the invention.

SUMMARY OF THE INVENTION

In accordance with the present invention, cutting means, either in the form of rods or a hollow cylindrical drum, are provided spanning the gap between a helicopter fuselage and the rotor assembly which rotate with the rotor and cut any engaged wire prior to the wire causing a crash of the helicopter. The cutting means have cutting edges thereon which have a leading edge at the upper and lower ends thereof positioned in advance of their midportion, relative to the direction of rotation of the rotor, to force any engaged wire toward the midpoint of the cutters.

DESCRIPTION OF THE DRAWINGS

The foregoing summary, as well as the following detailed description, will be better understood when read in conjunction with the drawings appended hereto. For the purposes of illustrating the invention, there is shown in the drawings presently preferred forms of the present invention, it being understood that the invention is not limited to the precise arrangements shown.

DETAILED DESCRIPTION OF THE INVENTION

Figure 1:
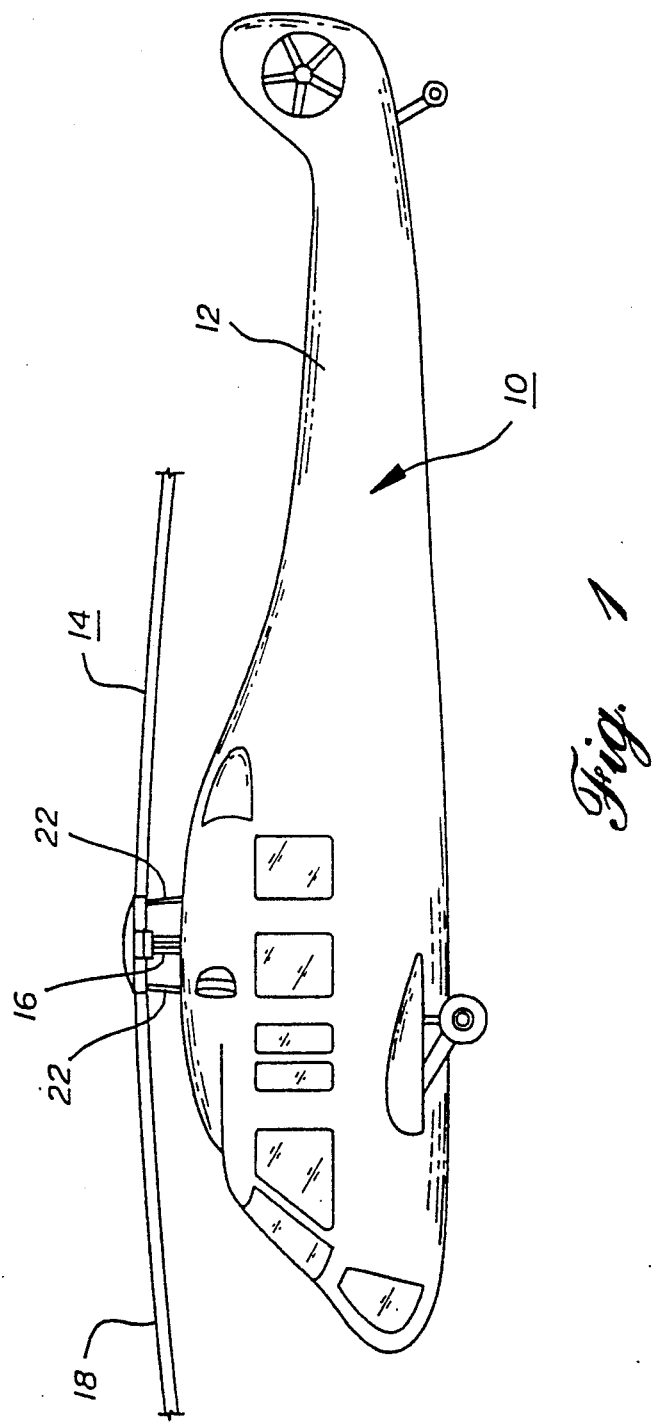
FIG. 1 is a side elevational view of a helicopter utilizing a wire cutter of the present invention.

Referring more specifically to the drawings, in FIG. 1 there is shown a helicopter 10 having a fuselage 12 and a rotor assembly 14. The rotor assembly includes a rotor mast 16, rotor blades 18, a swash plate 20 for controlling the pitch of the rotor blades and pitch control rods 22 interconnecting the swash plate and the rotor blades. In accordance with the invention as shown in FIG. 1, each pitch control rod 22 functions as a cutter blade to cut a wire in the event a wire is trapped between the helicopter fuselage and rotor assembly.

Figure 3:
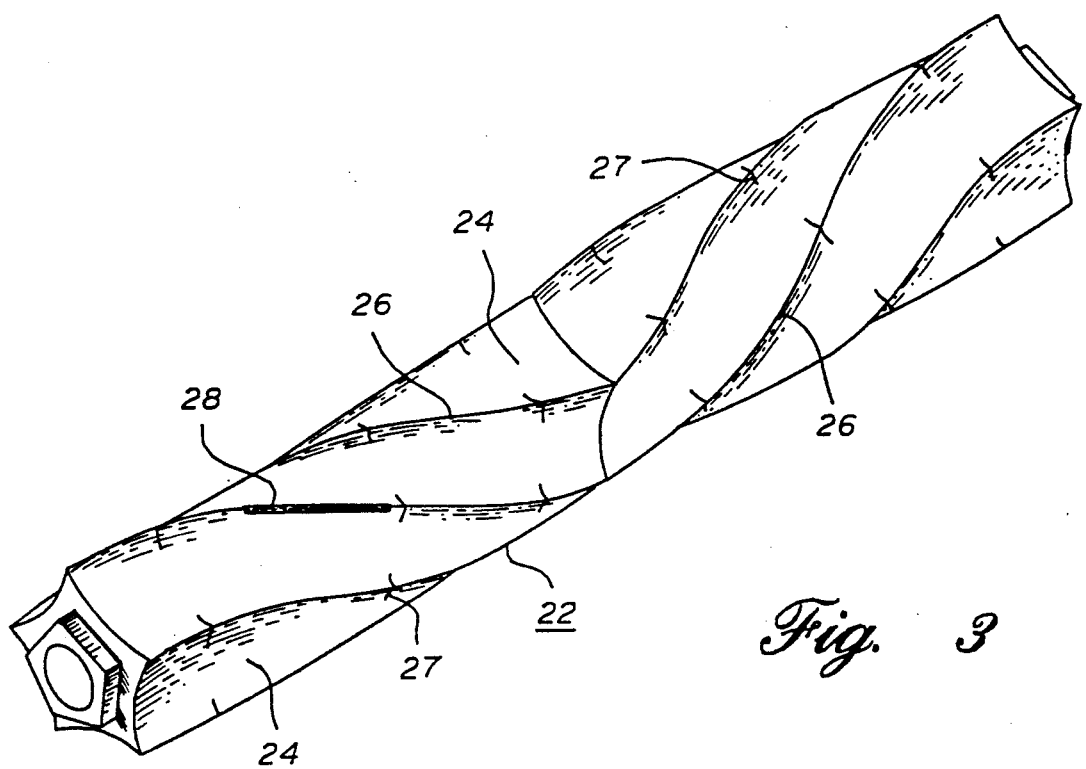
FIG. 3 is a perspective view of a control rod wire cutter element of the present invention.
Figure 4:
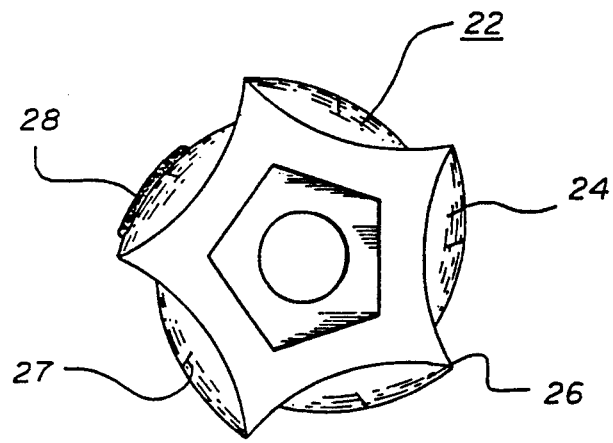
FIG. 4 is an end elevational of a control rod wire cutter element.

One form of a combined pitch control rod and wire cutter is shown in FIGS. 3 and 4. This control rod has multiple longitudinal faces 24. In the present instance, five faces are provided on the control rod with a cutting edge 26 formed at the junction of each face. Each cutting edge 26 faces in the direction of rotation of the rotor assembly to cut any wire it might engage.

Figure 2:
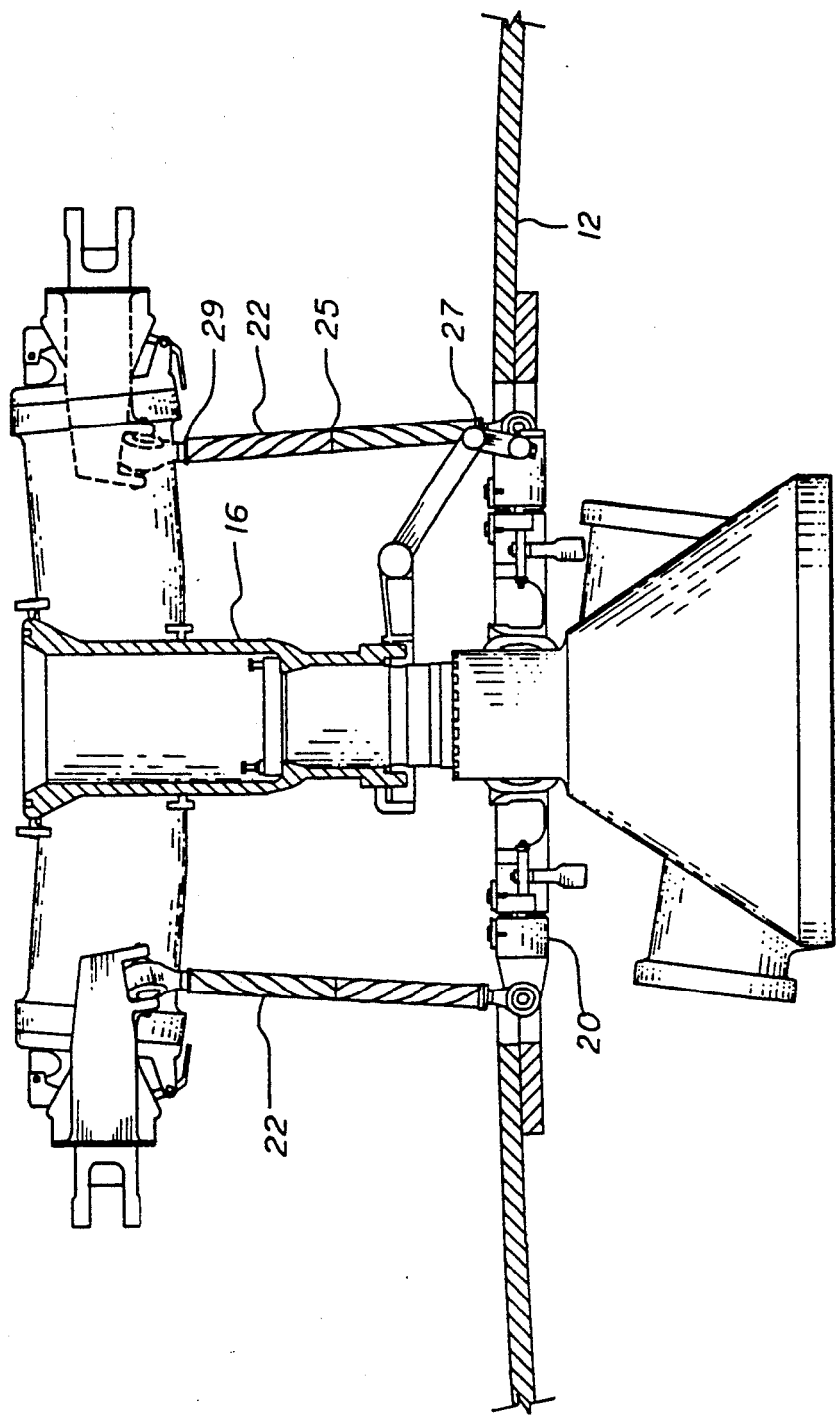
FIG. 2 is a side elevational view of a preferred form of the strike wire cutter of the present invention.

Also, in accordance with the present invention, the cutting edges are so arranged that they tend to direct an engaged wire toward the mid point of the control rod. This is accomplished by providing an opposite twist to the longitudinal faces 24 at opposite ends of the control rod. As shown in FIGS. 2 and 3, the longitudinal faces 24 twist helically about the longitudinal axis of control rod 22. The direction of twist of faces 24 relative tot he direction of rotation of the rotor assembly directs a wire towards the midpoint 25 of the control rod 22. This is more clearly shown in FIG. 2 where the direction of twist on the lower section of rod 22 is opposite the direction of twist on the upper section. In other words, the twist is such that the cutting edges at the ends of the control rods lead, or are in advance of, that portion of the cutting edge at the midpoint of the control rod, relative to the direction of rotation of the rotor assembly. Thus the direction of twist of faces 24 in the lower section of control rod 22 going from the bottom end 27 to the midpoint 25 will be opposite of the direction of rotation of the rotor assembly, thereby forcing an engaged wire upward. Likewise, the direction of twist of faces 24 on the upper section of rod 22 going from the midpoint 25 to the upper end 29 will be the same as the direction of rotation of the rotor assembly, thereby directing an engaged wire downward.

To relieve stress due to axial loading on the control rods, circumferential radial cuts 27 may be provided at spaced intervals along the cutting edges 24. Also, for the protection of maintenance workers, a rubber beading 28 may be applied along the entire length of each cutting edge 26. Upon contact with a wire, the rubber bead will disintegrate.

With this arrangement, as the control rods engage a wire, the wire is caused to move toward the midpoint of the control rods and is simultaneously cut. This effectively directs the cut ends of the wire away from the rotor blades and the fuselage.

The above described cutting arrangement is completely satisfactory for those helicopters where the control rods for controlling the pitch of the blades completely span the space between the rotor blades and the fuselage. However, in some helicopter models the control rods terminate short of the helicopter fuselage, permitting a wire to engage the rotor assembly without contacting the control rods. To insure proper protection of the helicopter where the control rods do not extend completely from the fuselage to the rotors, the embodiment of the invention shown in FIGS. 5 to 8, inclusive, is used.

Figure 6:
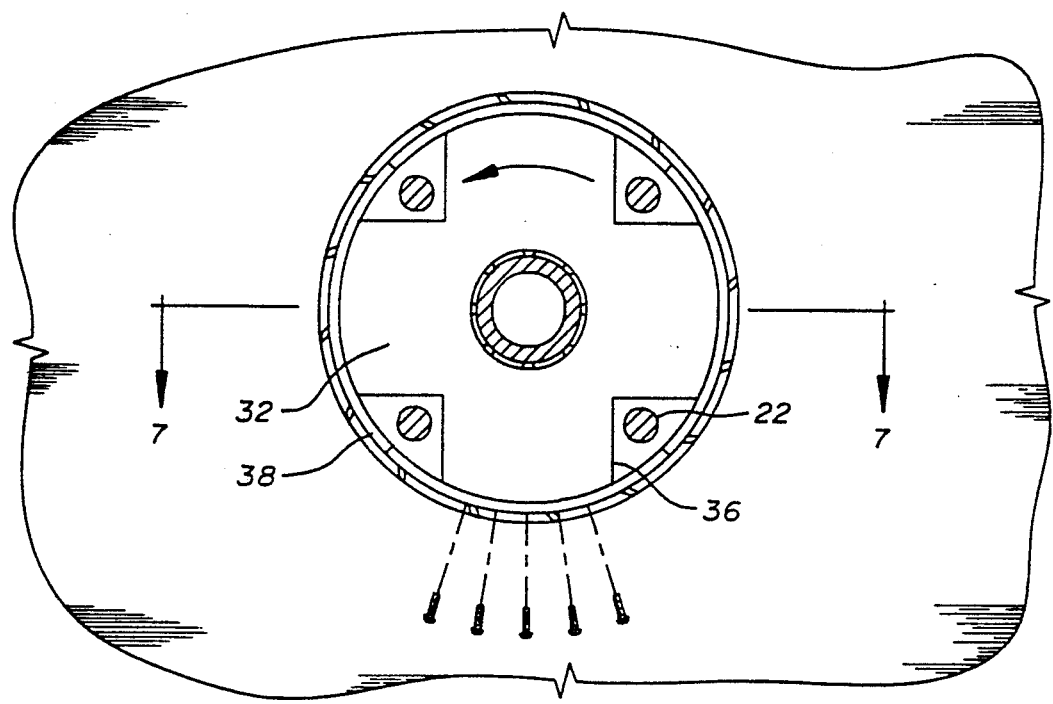
FIG. 6 is a top plan view of the wire strike cutter of FIG. 5.
Figure 7:
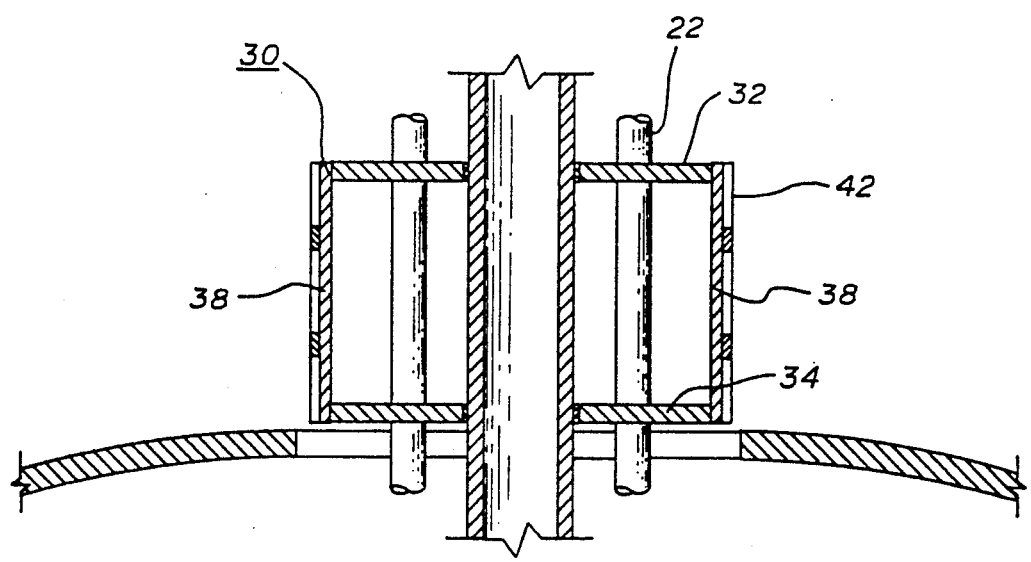
FIG. 7 is an enlarged longitudinal sectional view of the wire strike cutter of FIG. 5.
Figure 10:
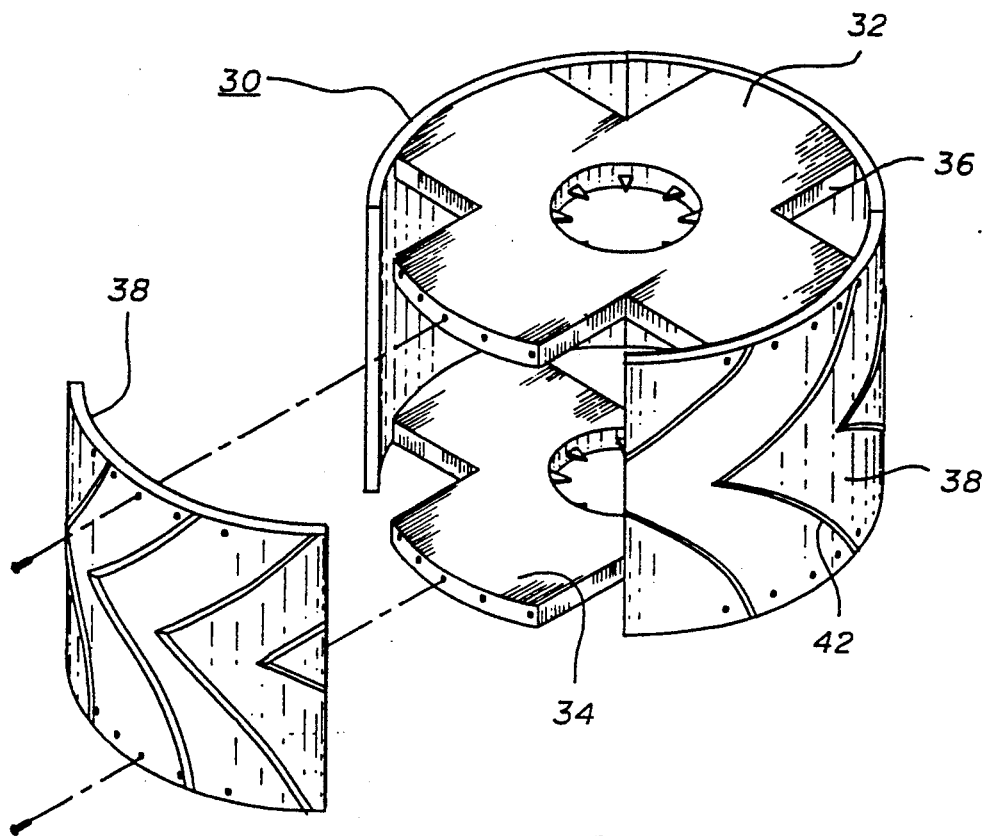
FIG. 10 is a perspective view of the wire strike cutter of FIG. 5.
Figure 8:
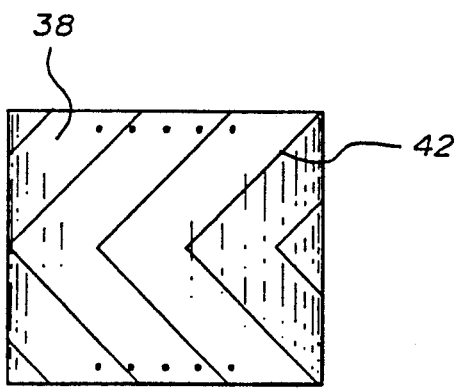
FIG. 8 is a side elevational view of one cutting plate of the wire strike cutter of FIG. 5.
Figure 9:
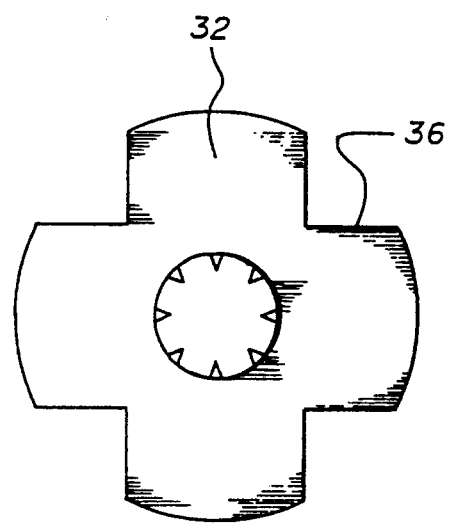
FIG. 9 is a plan view of the mounting plate for the wire strike cutting plates.

In this embodiment, a drum assembly 30 is provided surrounding the control rods and extending from the helicopter fuselage to the rotor blades. The drum assembly 30 comprises upper and lower support plates 32 and 34, respectively carried by and rotatable with the rotor shaft. The support plates are generally circular in shape with cut-out segments 36 to accommodate passage of the control rods. A series of drum segments 38, formed as shown in FIGS. 6 and 8 are bolted or otherwise secured to the upper and lower support plates to form a continuous cylindrical drum. Cutting blades 42 are mounted on the drum segments, each blade 42 having a cutting edge facing in the direction of rotation of the rotor assembly. As in the embodiment of FIG. 1, the cutting blades extend the full height of the drum and are arranged to direct an engaged wire toward the midpoint of the drum.

Figure 5:
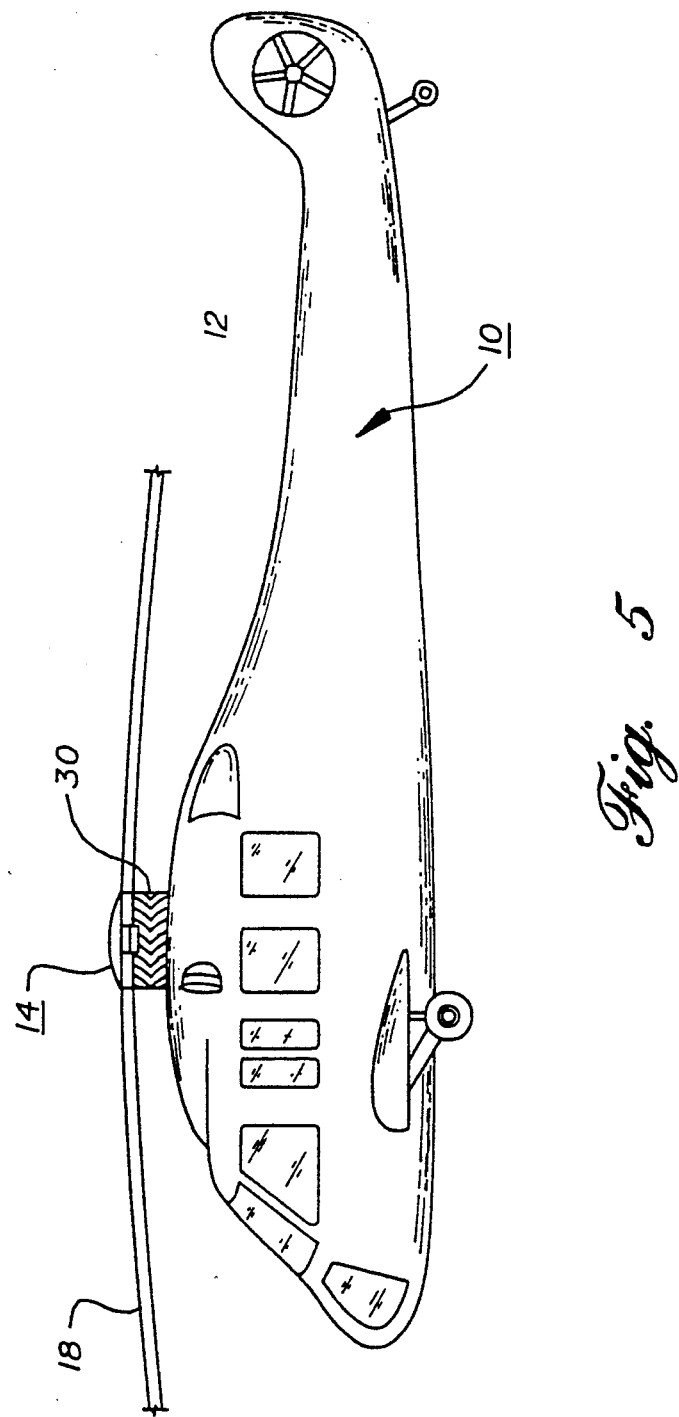
FIG. 5 is a side elevational view of a helicopter with a modified form of the wire strike cutter.

With reference to FIGS. 5 and 8, the cutting blades 42 have their edges at the top and bottom of the drum in advance of, or leading the edge portions at the midpoint of the drum. As in the prior embodiment, cutting edges 42 twist helically about the surface of drum 30. The direction of twist on the lower section of drum 30 is opposite of that on the upper section. This herringbone arrangement of the cutting edges will tend to move an engaged wire toward the center of the drum.

While particular embodiments of the present invention have been disclosed herein, it is not intended to limit the invention to such a disclosure, and changes and modifications may be incorporated and embodied within the scope of the following claims.

I claim:

1. In helicopter wire strike cutting apparatus for a helicopter comprising a fuselage, a rotor assembly, rotor blades carried by the rotor assembly spaced from the fuselage and control rods to control the pitch of the rotor blades;
cutting means to cut wire engaged by the motor assembly between the rotor blades and fuselage, said cutting means including a cutting edge extending from adjacent the fuselage to a point adjacent the rotor blades, and said cutting means rotating with the rotor assembly.

2. Apparatus in accordance with claim 1 wherein said cutting means is on each of said control rods, and said cutting edge extends substantially the full length of each of said control rods.

3. Apparatus in accordance with claim 2 wherein said control rods have a plurality of concave faces extending longitudinally thereof, each face having a leading edge relative to the direction of the rotor, and a cutting edge on the leading edge of each said concave face.

4. Apparatus in accordance with claim 3 wherein said plurality of concave faces extend in a helical arrangement longitudinally of said control rods.

5. Apparatus in accordance with claim 4 wherein said concave faces extend helically about said control rods in one direction from the midpoint of each control rod to one end thereof and helically in the opposite direction from said midpoint to the opposite end thereof.

6. Apparatus in accordance with claim 5 wherein the direction of twist of said cutting edges from the bottom of said control rods to the midpoint thereof is the opposite of the direction of rotation of the rotor assembly, said direction of twist directing a strike wire toward the midpoint of said rod.

7. Apparatus in accordance with claim 3 wherein a flexible rubber bead is provided over the entire length of each of said cutting edges.

8. Apparatus in accordance with claim 1 wherein a cylindrical drum is provided carried by said rotor assembly, said cylindrical drum surrounding said control rods, a plurality of said cutting edges, and said cutting edges being carried by said drum.

9. Apparatus in accordance with claim 8 wherein said drum comprises upper and lower end plates mounted on said rotor assembly and rotatable therewith, and a plurality of arcuate drum segments arranged in side-by-side relationship and secured to said upper and lower end plates.

10. Apparatus in accordance with claim 9 wherein said cutting edges are formed on individual cutting elements, and said cutting elements are mounted on said arcuate drum segments extending from one end thereof adjacent the rotor blades to the other end thereof adjacent the fuselage.

11. An apparatus for cutting wires striking a helicopter having a fuselage, a rotor assembly, and rotor blades carried by the rotor assembly, said apparatus comprising:
a control rod positioned between the rotor blades and the fuselage, said rod attached to and rotating with the rotor assembly and having an upper and lower end; and
a cutting edge extending between the fuselage and the rotor assembly along the longitudinal length of said rod.

12. An apparatus for cutting wires striking a helicopter in accordance with claim 11, wherein said control rod has multiple longitudinal faces, and said cutting edge extends along the junction of said faces.

13. An apparatus for cutting wires striking a helicopter in accordance with claim 12, wherein said longitudinal faces twist helically about the longitudinal axis of said control rod to control the movement of engaged strike wires.

14. An apparatus for cutting wires striking a helicopter in accordance with claim 13, wherein said longitudinal faces of the upper and lower ends twist helically in opposite directions relative to each other along the longitudinal axis of said rod.

15. Apparatus in accordance with claim 13 wherein the cutting edges on the bottom section of said drum from the bottom of said drum to the midpoint thereof, twist about said drum in a direction opposite the direction of rotation of the rotor assembly and wherein the cutting edges on the upper section of said drum twist in a direction opposite that on the bottom section.

16. An apparatus for cutting wires striking a helicopter having a fuselage, a rotor assembly, and rotor blades carried by the rotor assembly, said apparatus comprising:
- a cylindrical drum positioned between the rotor blades and the fuselage, said drum attached to and rotating with the rotor assembly; and
- a plurality of cutting edges extending between the rotor blades and the fuselage along the outside surface of said drum.

17. An apparatus for cutting wires striking a helicopter in accordance with claim 16, wherein said cutting edges twist helically about the surface of said drum to direct the movement of engaged strike wires.

18. An apparatus for cutting wires striking a helicopter in accordance with claim 17, wherein said cutting edges on the top half of said drum twist in the opposite direction from said cutting edges of the bottom half of said drum.

* * * * *